(12) United States Patent
Lastowka

(10) Patent No.: US 12,533,556 B2
(45) Date of Patent: Jan. 27, 2026

(54) METHOD OF RECLAIMING RESOURCES FROM GOLF BALLS

(71) Applicant: Acushnet Company, Fairhaven, MA (US)

(72) Inventor: Eric Lastowka, Hanover, MA (US)

(73) Assignee: Acushnet Company, Fairhaven, MA (US)

( * ) Notice: Subject to any disclaimer, the term of this patent is extended or adjusted under 35 U.S.C. 154(b) by 625 days.

(21) Appl. No.: 18/087,024

(22) Filed: Dec. 22, 2022

(65) Prior Publication Data

US 2024/0207687 A1  Jun. 27, 2024

(51) Int. Cl.
*A63B 37/00* (2006.01)
*B29B 17/02* (2006.01)
*B29B 17/04* (2006.01)

(52) U.S. Cl.
CPC ............ *A63B 37/005* (2013.01); *B29B 17/02* (2013.01); *B29B 17/04* (2013.01); *B29B 2017/0268* (2013.01); *B29B 2017/042* (2013.01); *B29B 2017/0496* (2013.01)

(58) Field of Classification Search
CPC ................................................... A63B 37/005
See application file for complete search history.

(56) References Cited

U.S. PATENT DOCUMENTS

| 6,677,401 B2 | 1/2004 | Boehm et al. |
| 6,992,135 B2 | 1/2006 | Boehm et al. |
| 2013/0320576 A1* | 12/2013 | Ishii .................... B29B 17/02 264/36.12 |

\* cited by examiner

*Primary Examiner* — Jacob T Minskey
*Assistant Examiner* — Adrien J Bernard
(74) *Attorney, Agent, or Firm* — Bradley Arant Boult Cummings LLP

(57) ABSTRACT

Methods of reclaiming resources from finished golf balls and incorporating the reclaimed resources into a manufacturing process for making golf balls or components of golf balls.

21 Claims, 1 Drawing Sheet

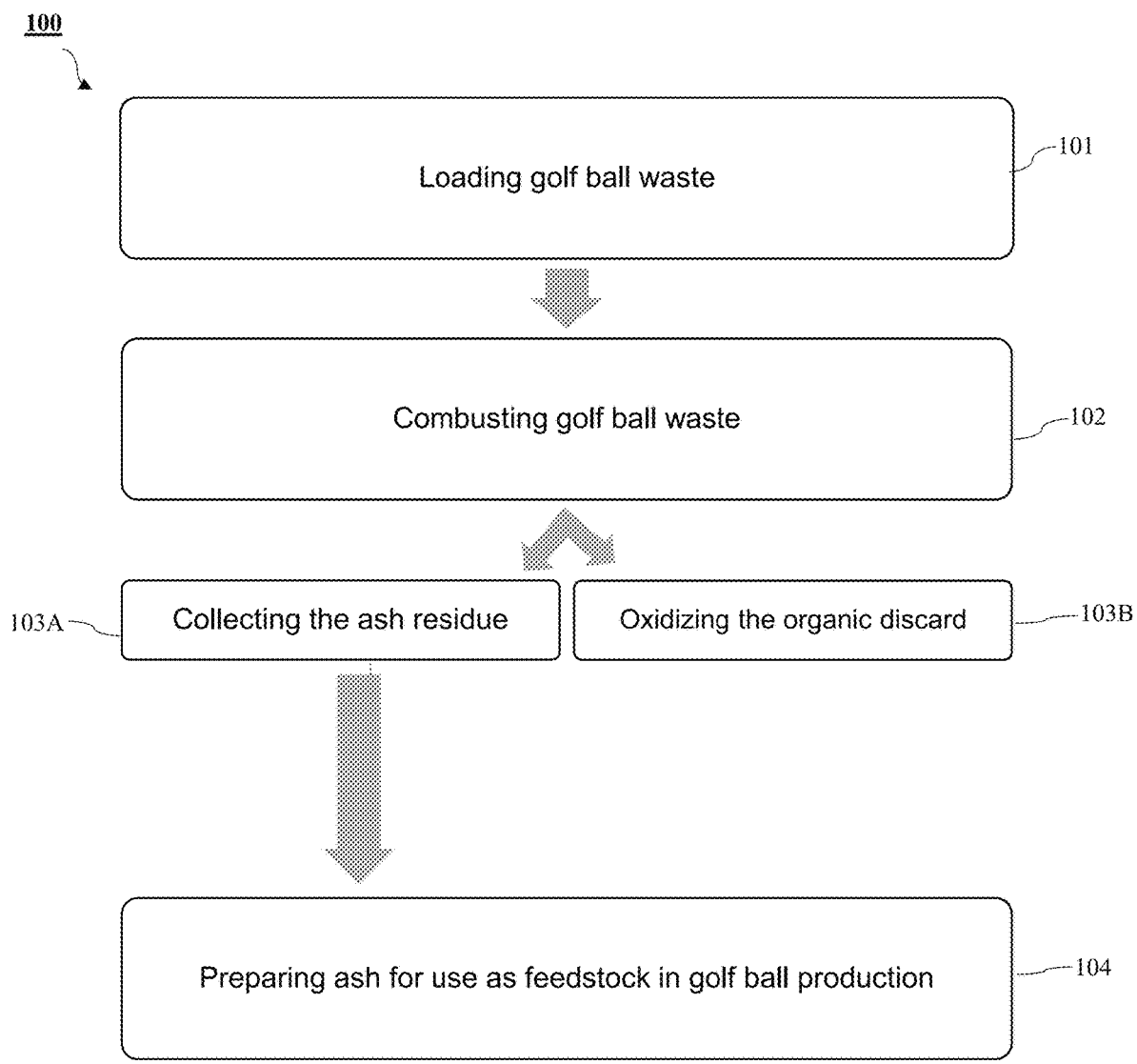

METHOD OF RECLAIMING RESOURCES FROM GOLF BALLS

FIELD OF THE INVENTION

The present disclosure relates generally to methods of reclaiming resources from finished golf balls and incorporating the reclaimed resources into a manufacturing process for making golf balls or components of golf balls. More particularly, the method of the present disclosure includes subjecting finished golf balls to a thermal process to drive out any and all organic material, collecting the reclaimed resources, which contain metal compounds, and using the reclaimed resources as a raw material for manufacturing golf balls and components thereof. In addition, energy recovered from the reclamation process may be employed as process heat for equipment used in the production of golf balls.

BACKGROUND OF THE INVENTION

Like any other unused piece of sports equipment, golf balls that are no longer being played or playable become solid waste. Likewise, scrap materials from production of new golf balls or golf balls that are rejected during the production process must be disposed of in some manner. However, disposal methods for this golf ball waste are limited and typically require mixing such golf ball waste with other municipal solid waste. Landfills, which are a significant source of greenhouse gases, are the primary recipient of such municipal solid waste. Thus, it is not surprising that the EPA has noted that nearly 40 percent of U.S. greenhouse gas emissions are related to material management, including at the end of material life.

Moreover, disposal of certain metals used in golf ball production and, more specifically, components of golf balls must be reported per EPA and/or other agency regulations. For example, the EPA requires companies to report on a yearly basis where certain metals have been released when used in certain amounts. Release reporting may be complicated and time-consuming.

To date, there is no large scale method of reclaiming the inorganic metals from spent, rejected or out-of-specification golf balls, or scrap materials leftover from production. As such, there remains a need to collect such metals and other useful components from otherwise unusable golf balls. It would also be advantageous to harness energy produced by the method and use in production of golf balls. Moreover, it would be beneficial to use the reclaimed resources as raw material for production of certain golf ball components.

SUMMARY OF THE INVENTION

The present disclosure is directed to a method of reclaiming inorganic resources from a golf ball, including: providing an incinerator comprising a primary chamber; heating the primary chamber to an operating temperature; feeding a plurality of golf balls into the primary chamber; combusting the plurality of golf balls to produce an organic discard and an ash residue; collecting the ash residue, wherein the ash residue comprises about 2 percent to about 6 percent by weight metal components based on the total weight of the plurality of golf balls fed into the primary chamber; using the ash residue in a rubber composition; and forming a golf ball core or portion thereof from the rubber composition.

In one embodiment, the metal components include zinc, barium, titanium, or a combination thereof. In another embodiment, the operating temperature is about 300° C. to about 1600° C. For example, the operating temperature may be about 400° C. to about 900° C. In still another embodiment, the step of feeding is performed at a feed rate of about 500 to about 15,000 golf balls every 15 minutes. In yet another embodiment, the step of collecting further includes cooling the ash residue with water.

The present invention is also directed to a method of reclaiming metal components from a golf ball, including: providing an incinerator comprising a primary chamber; heating the primary chamber to an operating temperature; feeding a plurality of golf balls into the primary chamber; combusting the plurality of golf balls to produce an organic discard and an ash residue; collecting the ash residue, wherein the ash residue comprises about 3 percent to about 5 percent by weight of metal components based on the total weight of the plurality of golf balls fed into the primary chamber; extracting the at least one metal component from the ash residue; using the at least one metal component in a rubber composition; and forming a golf ball core or portion thereof from the rubber composition.

In one embodiment, the metal component includes zinc, barium, titanium, or a combination thereof. In another embodiment, the step of extracting further includes adding carbon to the ash residue. In still another embodiment, the operating temperature is about 300° C. to about 1600° C. For example, the operating temperature may be about 800° C. to about 1200° ° C. In yet another embodiment, the step of feeding is performed at a feed rate of about 1 lb to about 100 lbs every minute. In another embodiment, the incinerator includes a secondary chamber to oxidize the organic discard.

The present disclosure also relates to a method of recycling a golf ball, including: providing an incinerator comprising a primary chamber and a secondary chamber; heating the primary chamber to an operating temperature; feeding a plurality of golf balls into the primary chamber; combusting the plurality of golf balls to produce an ash residue and an organic discard, wherein the step of combusting releases heat energy; oxidizing the organic discard in the secondary chamber; collecting the ash residue, wherein the ash residue comprises about 2 percent to about 5 percent by weight of metal components based on the total weight of the plurality of golf balls fed into the primary chamber; and capturing the heat energy to use in the step of combusting, in a golf ball production process, or a combination thereof.

In one embodiment, the metal component includes zinc, barium, titanium, or a combination thereof. In another embodiment, the step of extracting further includes adding carbon to the ash residue. In still another embodiment, the operating temperature is about 300° C. to about 1600° C. For example, the operating temperature may be about 400° C. to about 900° C. In another embodiment, the operating temperature is about 800° ° C. to about 1200° C. In yet another embodiment, the step of feeding is performed at a feed rate of about 1 lb to about 100 lbs every minute. In another embodiment, the incinerator further includes a heat recovery system.

BRIEF DESCRIPTION OF THE DRAWINGS

Further features and advantages of the invention can be ascertained from the following detailed description that is provided in connection with the drawings described below:

FIG. 1 is a flowchart illustrating the steps according to a method for reclaiming resources from golf balls in accordance with an embodiment of the present disclosure.

DETAILED DESCRIPTION OF THE INVENTION

The present disclosure relates to reclamation processes for golf balls that produce raw materials and useful energy. More particularly, assembled golf balls may be subjected to a thermal process that drives out organic material and leaves only inorganic material in ash. Because golf balls contain certain metals, the ash residue will also contain metal compounds that may be used as a raw material in manufacturing certain golf components.

In addition, the reclamation process of the present disclosure generates heat from the combustion of the golf ball materials that can be recovered as energy and used for other processes such as in the production of golf ball components. Moreover, the collection of abandoned golf balls from golf courses, driving ranges, and the like would reduce the environmental impact of such abandoned golf balls.

The inventive process is discussed in greater detail below.

Reclamation Process

Golf balls are formed from a variety of materials including organic and inorganic compounds. For example, core components are generally formed of a rubber composition that includes a base rubber material such as polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and the like; a reactive cross-linking co-agent such as metal salts of unsaturated carboxylic acids having from 3 to 8 carbon atoms, unsaturated vinyl compounds and polyfunctional monomers, phenylene bismaleimide, and the like; radical scavengers such as a halogenated organosulfur, organic disulfide, an inorganic disulfide compound, and the like; fillers such as metal oxide, metal sulfate fillers, carbon black, clay and nanoclay particles, talc, glass, mica, and combinations thereof; and additives such as antioxidants, processing aids, accelerators, dyes and pigments, wetting agents, surfactants, plasticizers, coloring agents, chemical blowing agents, foaming agents, defoaming agents, stabilizers, softening agents, impact modifiers, antiozonants, and the like. Intermediate layers and cover layers are formed from a variety of materials including, but not limited to, polyurethane, polyurea, olefin-based copolymer ionomer resins, polyethylene, polypropylene, rubber-toughened olefin polymers, acid copolymers, plastomers, flexomers, styrene/butadiene/styrene block copolymers, styrene/ethylene-butylene/styrene block copolymers, dynamically vulcanized elastomers, copolymers of ethylene and vinyl or methyl acetates, polyvinyl chloride resins, polyamides, poly(amide-ester) elastomers, and graft copolymers of ionomer, cross-linked trans-polyisoprene and blends thereof, polyester-based thermoplastic elastomers, polyurethane-based thermoplastic elastomers, synthetic or natural vulcanized rubber; and combinations thereof. As a result, the metals included in a golf ball may vary, but can include magnesium, calcium, zinc, aluminum, lithium, and nickel, as well as copper, steel, brass, tungsten, titanium, molybdenum, cobalt, iron, lead, tin, barium, bismuth, bronze, silver, gold, and platinum, and alloys and combinations thereof.

The feedstock includes any such golf ball and, preferably, includes spent golf balls that are at the end of their useful existence, as well as scrap rubber and rejected golf balls from the golf ball production process ("golf ball waste"). A high temperature, dry oxidation process may be used in accordance with the present disclosure to reduce organic and combustible waste to inorganic, incombustible matter. The process may incorporate an incinerator that receives and subjects the feedstock to a thermochemical reaction. The thermochemical reaction is preferably exothermic so as to enable the harnessing of heat generated by the process as fuel, but endothermic processes are also contemplated.

In this aspect, the present disclosure is not limited to any particular incinerator and may include any incinerator capable of combusting the feedstock and producing organic-free ash. For example, the incinerator used in the reclamation process of the present disclosure may be a rotary kiln incinerator, a single chamber incinerator, a drum and brick incinerator, a fluidized bed incinerator, or a pyrolytic chamber incinerator. In some embodiments, the incinerator has a primary chamber and a secondary chamber. Moreover, the incinerator may include an air-pollution control system. The main function of the primary chamber is to volatilize the organic fraction of the feedstock and the main function of the secondary chamber is to heat the vaporized organics to a temperature where they will be completely oxidized. In some aspects, the primary chamber is operated in the presence of oxygen. In other aspects, the primary chamber is operated in the absence or near absence of oxygen, e.g., a pyrolytic chamber.

The primary chamber may expose the feedstock to temperatures ranging from about 300° C. to about 1600° C. In some embodiments, the operating temperature in the primary chamber is about 500° ° C. to about 1400° C. For example, the operating temperature in the primary chamber may range from about 800° ° C. to about 1200° C. In other embodiments, the primary chamber has an operating temperature of about 400° ° C. to about 900° C. In still other embodiments, the primary chamber may have an operating temperature of about 1000° ° C. to about 1600° C. Without being bound to any particular theory, using sufficiently high temperatures can prevent the formation of toxic components, such as dioxin. The primary chamber may be fired by natural gas, oil, or other suitable fuel.

The feed rate of the feedstock may vary depending on the size, type, and operating temperature of the primary chamber. For example, the feed rate may be about 500 to about 15,000 golf balls every 15 minutes. In one embodiment, the feed rate is about 500 to about 10,000 golf balls every 15 minutes. In another embodiment, about 500 to about 5,000 golf balls every 15 minutes. In another aspect, the feed rate may be about 100 lbs to about 1,600 lbs every 15 minutes. For example, the feed rate may be about 500 lbs to about 1,300 lbs every 15 minutes. In this aspect, the feedstock may be introduced into the primary chamber in a batch process where the entirety of a first batch of feedstock may be introduced into the primary chamber to be combusted before a second batch of feedstock is introduced.

In another embodiment, the feed rate is about 1 lb to about 100 lbs every minute. In still another embodiment, the feed rate is about 5 lbs to about 75 lbs every minute. In still another embodiment, the feed rate is about 1 lb to about 25 lbs every minute. In yet another embodiment, the feed rate is about 5 to 15 lbs per minute. In still another embodiment, the feed rate is about 7 lbs to 12 lbs per minute. For example, the feed rate may be about 8 lbs to about 10 lbs per minute. In this aspect, the feedstock may be continuously or substantially continuously introduced into the primary chamber for combusting. Loading of the feedstock into the primary chamber may be carried out mechanically or manually.

As the residence time in the primary chamber may influence the degree of conversion of solid ash product, it may vary depending on the type of chamber, operating temperature, feed rate, or combinations thereof. In some embodiments, the residence time is about 2 minutes to about 15 minutes. In other embodiments, the residence time is about 5 minutes to about 30 minutes. In still other embodiments, the residence time is about 15 minutes to about 60 minutes. The ash residue may be collected/removed from the primary chamber and any gases produced in the primary chamber are heated to a high temperature in the secondary chamber to burn off gaseous organic compounds.

In some embodiments, a large municipal waste combustor may be used. In this aspect, the primary chamber may use pre-heated air along with the calorific value of the waste stream. In other embodiments, a rotary kiln incinerator may be employed. In this aspect, the primary chamber is a rotating oven that rotates about 1 to about 10 times per minute. In one embodiment, the rotating oven rotates about 2 to about 8 times per minutes. In another embodiment, the rotating oven rotate about 1 to about 6 times per minute. The operating temperature in the rotating oven may be about 1200° C. to about 1600° C. The ash residue is collected/removed from the bottom of the oven and any gases produced in the oven are heated in the secondary chamber/post-combustion chamber to burn off gaseous organic compounds.

In still other embodiments, a fluidized bed incinerator may be employed. Without being bound to any particular theory, this type of incinerator may be used because the feedstock is uniformly sized solid waste. In this aspect, the primary chamber may include a fluidized bed including sand or alumina on which combustion occurs. The feedstock is added into the primary chamber and the air flow is heated to at least ignition temperature of the feedstock so that the golf ball waste burns (oxidizes) within the primary chamber. The ash residue remains in the bed and may be collected therefrom. A secondary chamber processes the vaporized organics to a temperature where they are completely oxidized.

Regardless of the incinerator type, the ash residue may be cooled before outputting or being collected from the primary chamber. In one embodiment, the ash residue is water-cooled before outputting. Any ash generated from the secondary chamber, i.e., from the suspended particles in the exhaust gas, may be gathered alone or with the ash residue from the primary chamber.

The ash residue is about 5 percent to about 30 percent by weight of the total weight of the feedstock. In one embodiment, the ash residue is about 10 percent to about 25 percent by weight of the total weight of the feedstock. In another embodiment, the ash residue is about 15 percent to about 25 percent by weight of the total weight of the feedstock. In this regard, the reclamation process of the present disclosure may generate about 2 lbs to about 1800 lbs of ash residue per hour. In one embodiment, the reclamation process of the present disclosure may generate about 5 lbs to about 1500 lbs of ash residue per hour.

As generally discussed above, the ash residue collected from the reclamation process may include metal compounds such as, but not limited to, zinc, barium, and titanium. In some embodiments, the ash residue may include about 2 percent to about 8 percent metal compounds by weight of the total weight of the feedstock. In other embodiments, the ash residue may include about 3 percent to about 7 percent metal compounds by weight of the total weight of the feedstock. In this aspect, the ash residue may include about 2 percent to about 5 percent zinc by weight of the total weight of the feedstock. In one embodiment, the ash residue may include about 3 percent to about 4 percent zinc by weight of the feedstock. Similarly, the ash residue may include about 2 percent to about 5 percent barium by weight of the total weight of the feedstock. In one embodiment, the ash residue may include about 3 percent to about 4 percent barium by weight of the feedstock. Likewise, the ash residue may include about 1 percent to about 3 percent titanium by weight of the total weight of the feedstock. In one embodiment, the ash residue may include about 2 percent to about 3 percent titanium by weight of the feedstock.

As shown in FIG. 1, the reclamation process 100 may include a first step 101 of loading the feedstock into the primary chamber of the incinerator. Once the feedstock has been loaded into the primary chamber, the golf ball waste is combusted in step 102. In step 103A, the ash residue is collected from the primary chamber and in step 103B, the organic discard is oxidized in the secondary chamber of the incinerator. The ash residue (or metal components therein) may be prepared for use in golf ball production in step 104. While not shown, the energy released from step 102 may be captured for use in subsequent combustion or for use in golf ball production.

Use of Heat Generated as Fuel

In some embodiments, one or more forms of energy released and/or generated is harnessed and converted to useful energy for the thermal conversion process or a different process such as one or more steps in the production of golf balls. In this aspect, the heat generated from the reclamation process may be used as fuel for the incinerator. For example, heat energy that exits with the flue gases may be used to preheat combustion air or captured in one or more boiler systems used in the golf ball production process. In this regard, the incinerator used in the reclamation process of the present disclosure may include a heat recovery system. Energy may also be recovered from the thermal process of the present disclosure through a gas to water heat exchange where the water is converted to steam, which may then be used to generate electricity through steam turbines.

While most of the energy from the thermal process is released as heat energy, fuel and/or gas may also be generated. In fact, because about 90 percent by weight or more of a golf ball (based on the total weight of the golf ball) is rubber and rubber has a high content of hydrocarbons, golf ball waste presents a reasonable source of fuel. For example, use of a pyrolytic primary chamber may produce oil that can be used as a synthetic bio-diesel fuel.

In this aspect, since the composition of the golf ball waste is relatively consistent, the feedstock will not vary widely in type or quantity and, thus, the energy generated from the thermal process is also expected to be fairly consistent. Moreover, without being bound to any particular theory, since the feedstock does not have a high moisture content (as compared to other solid waste), the incinerator may run at maximum efficiency rather than expending extra energy in order to evaporate off the moisture in the feedstock.

As such, while the reclamation process of the present disclosure certainly does not recover all of the energy consumed during production of golf balls, it is contemplated that energy recovered from incineration of golf balls is more predictable than, for example, thermal conversion processes for municipal solid waste. In this regard, the recovered energy from the reclamation process of the present disclosure ranges between about 2 percent and about 50 percent of the total energy consumed during golf ball production. In some embodiments, the energy recovered is about 5 percent to about 30 percent of the total energy consumed during golf ball production. In other embodiments, the energy recovered is about 10 percent to about 25 percent of the total energy consumed during golf ball production.

Without being bound by any particular theory, any carbon emissions that occur from producing energy from golf ball waste may be offset by the greenhouse gases avoided by keeping the golf ball waste out of landfills and recycling the metal for new golf ball production (as discussed below).

Use of Ash Collected as Feedstock

At the end of the reclamation process, the ash residue that remains that must be managed and disposed of safely. Finding a better use for this ash residue has long been a challenge. With respect to the ash residue from golf ball waste, the reclamation process of the present disclosure contemplates use of the ash residue as a feed material in the production of golf ball components. In this regard, the use of the ash residue recovered from the reclamation process would reduce the demand and/or cost of certain raw materials that are commonly used in the production of certain golf ball components. For example, the ash residue may be used as a raw material in the production of rubber golf ball components, such as golf ball centers and core layers.

In one embodiment, the ash residue is refined prior to use as feedstock for golf ball components. For example, as discussed above, the ash residue may include a certain amount of zinc, barium, and/or titanium. Any or all of these metal components in the ash residue may be separated in a recycling unit. In one embodiment, carbon may be added to the ash residue to aid in recovery of the zinc from the ash residue. In another embodiment, lime may be added for acid leaching the ash residue. Similarly, barium and titanium may be recovered from the ash residue. For example, titanium may be recovered by reaction with chlorine to form titanium tetrachloride, distilling the titanium tetrachloride, and hydrolyzing to titanium dioxide. Once the metal components are extracted, they may be incorporated into a formulation useful in forming golf ball components. In some embodiments, the metals recovered from the ash residue may be used as additives or fillers in compositions used to form golf ball components. In other embodiments, zinc recovered from the ash residue is used to as a component in a rubber core composition. In other embodiments, titanium is used as a component in a rubber core composition, e.g., as a catalyst to synthesize polybutadiene rubber.

Subsequent Golf Ball Production

Golf balls and golf ball components that incorporate the raw material from the reclamation process may be formed using a variety of application techniques. For example, the golf ball, golf ball core, or any layer of the golf ball that incorporates the ash residue or metal components recovered from the ash residue may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like.

In one embodiment, the ash residue or metal components recovered from the ash residue is or are incorporated into a rubber core formulation used to form the center and, optionally, one or more core layers. Additional layers may be formed over the core using any suitable technique that is associated with the material used to form the layer. Preferably, each cover layer is separately formed over the core. For example, an ethylene acid copolymer ionomer composition may be injection-molded to produce half-shells over the core. Alternatively, the ionomer composition can be placed into a compression mold and molded under sufficient pressure, temperature, and time to produce the hemispherical shells, which may then be placed around the core in a compression mold. An outer cover layer including a polyurethane or polyurea composition over the ball sub-assembly may be formed by using a casting process.

The reclamation process and associated equipment may be situated in the same general location and/or building(s) as the production process and associated equipment. In the alternative, the reclamation process may occur in a first location and the ash residue may be transported to the second location for inclusion in golf ball compositions and components during production. In some embodiments, the reclamation process and refinement of the ash residue to extract the desired metal component(s) occurs in a first location and the extracted metal component(s) are transported to a second location for inclusion in golf ball compositions and components during production.

EXAMPLES

The following non-limiting example demonstrates a reclamation process in accordance with the present disclosure and subsequently tested ash. This example are merely illustrative of the preferred embodiments of the present disclosure and are not to be construed as limiting the disclosure, the scope of which is defined by the appended claims.

Example 1: Reclamation Process

Golf balls were fed into a large municipal waste combustor at a feed rate of 12,000 golf balls every 14-16 minutes for about four hours. The ash residue was cooled and collected. The ash residue amounted to 21.8 percent by weight based on the total weight of the golf ball feedstock. Zinc accounted for 3.22 weight percent based on the total weight of the golf ball feedstock.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the method in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A method of reclaiming inorganic resources from a golf ball, comprising:
   providing an incinerator comprising a primary chamber;
   heating the primary chamber to an operating temperature;
   feeding a plurality of golf balls into the primary chamber;
   combusting the plurality of golf balls to produce an organic discard and an ash residue;
   collecting the ash residue, wherein the ash residue comprises about 2 percent to about 6 percent by weight metal components based on the total weight of the plurality of golf balls fed into the primary chamber;
   using the ash residue in a rubber composition; and
   forming a golf ball core or portion thereof from the rubber composition.

2. The method of claim 1, wherein the metal components comprise zinc, barium, titanium, or a combination thereof.

3. The method of claim 1, wherein the operating temperature is about 300° ° C. to about 1600° C.

4. The method of claim 3, wherein the operating temperature is about 400° C. to about 900° ° C.

5. The method of claim 1, wherein the step of feeding is performed at a feed rate of about 500 to about 15,000 golf balls every 15 minutes.

6. The method of claim 1, wherein the step of collecting further comprises cooling the ash residue with water.

7. A method of reclaiming metal components from a golf ball, comprising:
   providing an incinerator comprising a primary chamber;
   heating the primary chamber to an operating temperature;
   feeding a plurality of golf balls into the primary chamber;
   combusting the plurality of golf balls to produce an organic discard and an ash residue;
   collecting the ash residue, wherein the ash residue comprises about 3 percent to about 5 percent by weight of metal components based on the total weight of the plurality of golf balls fed into the primary chamber;
   extracting the at least one metal component from the ash residue;
   using the at least one metal component in a rubber composition; and
   forming a golf ball core or portion thereof from the rubber composition.

8. The method of claim 7, wherein the metal component comprises zinc, barium, titanium, or a combination thereof.

9. The method of claim 7, wherein the step of extracting further comprises adding carbon to the ash residue.

10. The method of claim 7, wherein the operating temperature is about 300° C. to about 1600° C.

11. The method of claim 10, wherein the operating temperature is about 800° C. to about 1200° C.

12. The method of claim 7, wherein the step of feeding is performed at a feed rate of about 1 lb to about 100 lbs every minute.

13. The method of claim 7, wherein the incinerator comprises a secondary chamber to oxidize the organic discard.

14. A method of recycling a golf ball, comprising:
    providing an incinerator comprising a primary chamber and a secondary chamber;
    heating the primary chamber to an operating temperature;
    feeding a plurality of golf balls into the primary chamber;
    combusting the plurality of golf balls to produce an ash residue and an organic discard, wherein the step of combusting releases heat energy;
    oxidizing the organic discard in the secondary chamber;
    collecting the ash residue, wherein the ash residue comprises about 2 percent to about 5 percent by weight of metal components based on the total weight of the plurality of golf balls fed into the primary chamber; and
    capturing the heat energy to use in the step of combusting, in a golf ball production process, or a combination thereof.

15. The method of claim 14, wherein the metal component comprises zinc, barium, titanium, or a combination thereof.

16. The method of claim 14, wherein the step of extracting further comprises adding carbon to the ash residue.

17. The method of claim 14, wherein the operating temperature is about 300° C. to about 1600° C.

18. The method of claim 17, wherein the operating temperature is about 400° C. to about 900° C.

19. The method of claim 17, wherein the operating temperature is about 800° C. to about 1200° C.

20. The method of claim 14, wherein the step of feeding is performed at a feed rate of about 1 lb to about 100 lbs every minute.

21. The method of claim 14, wherein the incinerator further comprises a heat recovery system.

* * * * *